United States Patent
Romer et al.

(10) Patent No.: US 10,060,478 B2
(45) Date of Patent: Aug. 28, 2018

(54) ROLLER BEARING AND HYDROSTATIC AXIAL PISTON MACHINE OF SWASHPLATE DESIGN WITH A ROLLER BEARING

(71) Applicant: Robert Bosch GmbH, Stuttgart (DE)

(72) Inventors: Achim Romer, Ulm (DE); Christoph Assfalg, Neu-Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/166,839

(22) Filed: May 27, 2016

(65) Prior Publication Data

US 2016/0348716 A1    Dec. 1, 2016

(30) Foreign Application Priority Data

May 28, 2015 (DE) .................. 10 2015 209 798
May 13, 2016 (DE) .................. 10 2016 208 286

(51) Int. Cl.
| | | |
|---|---|---|
| *F16C 33/58* | (2006.01) |
| *F04B 1/12* | (2006.01) |
| *F01B 3/00* | (2006.01) |
| *F04B 1/20* | (2006.01) |
| *F16C 19/50* | (2006.01) |
| *F16C 27/04* | (2006.01) |

(52) U.S. Cl.
CPC ............ *F16C 33/586* (2013.01); *F04B 1/128* (2013.01); *F04B 1/2014* (2013.01); *F04B 1/2078* (2013.01); *F04B 1/2085* (2013.01); *F16C 19/502* (2013.01); *F16C 27/04* (2013.01); *F01B 3/0073* (2013.01); *F16C 2360/00* (2013.01)

(58) Field of Classification Search
CPC ...... F16C 19/502; F16C 27/04; F16C 33/586; F04B 1/2014; F04B 1/2028; F04B 1/2085; F01B 3/0073
See application file for complete search history.

(56) References Cited

U.S. PATENT DOCUMENTS

| | | | | |
|---|---|---|---|---|
| 5,286,117 A | * | 2/1994 | Wojan ................... | F16C 19/364 |
| | | | | 384/513 |
| 8,136,996 B2 | * | 3/2012 | Lemmers .............. | F16C 19/163 |
| | | | | 384/517 |
| 2007/0232428 A1 | * | 10/2007 | Hamada ................ | F16H 55/48 |
| | | | | 474/199 |

FOREIGN PATENT DOCUMENTS

| | | | |
|---|---|---|---|
| DE | 197 27 071 A1 | | 1/1999 |
| DE | 10 2008 013 010 A1 | | 7/2009 |
| DE | 10 2012 214 343 A1 | | 4/2013 |
| JP | 2000-145792 | * | 5/2000 |
| JP | 2005-133869 | * | 5/2005 |

(Continued)

*Primary Examiner* — James Pilkington
(74) *Attorney, Agent, or Firm* — Maginot, Moore & Beck LLP (57) ABSTRACT

A rolling bearing includes rollers clamped between an inner raceway and an outer bearing shell. The outer bearing shell bears with its outer circumferential surface against an outer component which can be a housing of an axial piston machine. The inner raceway is either formed directly on an inner component, or it is formed on an inner bearing shell, which bears against the inner component. In order to permit tilting of the inner component, wherein the rollers remain in predetermined contact with the two raceways, at least one beveled contact region or a region reduced in another way is provided on the outer circumferential surface of the outer bearing shell.

7 Claims, 5 Drawing Sheets

(56) References Cited

FOREIGN PATENT DOCUMENTS

JP    2006-226391    *  8/2006

* cited by examiner

ROLLER BEARING AND HYDROSTATIC AXIAL PISTON MACHINE OF SWASHPLATE DESIGN WITH A ROLLER BEARING

This application claims priority under 35 U.S.C. § 119 to patent application number DE 10 2015 209 798.6, filed on May 28, 2015 in Germany, and patent application number DE 10 2016 208 286.8, filed on May 13, 2016 in Germany, the disclosures of which are incorporated herein by reference in their entireties.

BACKGROUND

The disclosure relates to a roller bearing and to an axial piston machine of swashplate design with such a roller bearing.

In the case of axial piston machines, the working volume of which is adjustable, it is known to design a swashplate as a swivel cradle which can be swiveled towards a housing via an adjustment device. By adjusting the swivel angle of the swivel cradle in relation to a cylinder drum revolving about an axis, the stroke of the pistons coupled to the swashplate is adjusted during their revolution about an axis of the axial piston machines.

Since, during the adjustment of the swivel angle, the swivel cradle is moved relative to the housing of the axial piston machine, bearings are known for the mounting of the swivel cradle on both sides of the axis, said bearings being designed as pairs of circular-arc-shaped tracks, of which one track having a larger diameter is arranged on the housing, while a track having a smaller diameter is arranged on the swivel cradle.

During the operation of axial piston machines of this type, a respective supporting force is produced by the pistons against the swashplate, depending on the working pressure acting on the pistons, which supporting force can lead to deflection in the region of the swashplate approximately along the axis between the two bearings. Between the circular-arc-shaped tracks of each bearing, this results in a disadvantageous change in the positions of the tracks with respect to one another since the swivel-cradle track tilts in relation to the housing track and comes into an oblique position.

In documents DE 197 27 071 A1 and DE 10 2008 013 010 A1, the two tracks of each bearing form a plain bearing. DE 197 27 071 A1 discloses a hydrostatic load alleviation in the two plain bearings, said load alleviation being optimized in respect of the deflection of the swivel cradle. DE 10 2008 013 010 A1 has flexible regions in order to compensate for the deflection of the swivel cradle. It is proposed to flexibly configure that region of the housing against which a resting bearing shell bears, or that region of the swivel cradle that bears against the bearing shell and that moves in a sliding manner in relation to the bearing shell. Alternatively, it is proposed to configure the bearing shell itself to be flexible.

Document DE 10 2012 214 343 A1 presents a mounting of a swivel cradle of an axial piston machine, wherein each of the two bearings has a pair of circular-arc-shaped raceways, between which rolling elements are clamped. The swivel cradle is therefore supported in the housing via two roller bearings. The rolling elements are of barrel-shaped design, and therefore a deflection of the swivel cradle, and therefore a tilting or oblique position of the swivel-cradle raceway, can be compensated for by the shape of the rolling element by the contact points of the swivel cradle raceway against the rolling elements changing.

A disadvantage of such axial piston machines is that the barrel-shaped rolling elements always only have a reduced contact width, i.e. a reduced linear contact. During the operation of the axial piston machine with the deflection, which has to be tolerated, of the swashplate, the swivel cradle contact regions and also the housing contact regions migrate in the direction of the inner edge of the rolling elements. The bearing properties of the rolling elements are therefore disadvantageously affected.

SUMMARY

By contrast, the disclosure is based on the object of providing a roller bearing in which tilting or oblique positioning of one of the raceways can be tolerated without the rolling bearing being restricted to barrel-shaped or spherical rolling elements having a correspondingly reduced contact width. Furthermore, the disclosure is based on the object of providing an axial piston machine of swashplate design, in which the two rolling bearings of the swivel cradle can tolerate a deflection of the swivel cradle without the roller bearings being restricted to barrel-shaped or spherical rolling elements having a reduced contact width.

This object is achieved by a roller bearing with the features described herein and by an axial piston machine of swashplate design with the features described herein.

The roller bearing or rolling bearing has either two concentric circular-arc-shaped raceways or two raceways revolving in a circular-ring-shaped manner, between which a plurality of rolling elements are accommodated. The inner raceway can be formed on an inner (for example movable) bearing shell or on an inner (for example movable) component. The outer raceway is formed on an outer (for example stationary) bearing shell, on the outer circumference of which a contact region in the form of a portion of a circular cylinder is formed for an outer (for example stationary) component. According to the disclosure, a reduced region is formed adjacent to the contact region, said reduced region being positioned obliquely with respect to the contact region and/or being formed by a diameter which is reduced in relation to the contact region and/or by removal of material. A distance is therefore provided between the reduced region and the outer component and therefore a roller bearing is created in which tilting or oblique positioning of the inner raceways can be tolerated without the roller bearing being restricted to barrel-shaped or spherical rolling elements, since the rolling elements and the outer bearing shell can follow the tilting or oblique positioning at least in sections. The two raceways and the rolling elements remain in an approximately unchanged relative position with respect to one another, while the relative position of the outer bearing shell with respect to the outer component changes at least in sections in accordance with the tilting or oblique position.

In a particularly preferred development, the outer bearing shell is flexible. Put more precisely, the bearing shell is designed in such a manner that the reduced region is movable elastically outward in relation to the contact region and therefore toward the outer component. It is furthermore particularly preferred here if, during the elastic deformation of the reduced region, the contact region always remains in contact with the outer component.

In first embodiments of the disclosure, the contact region is a first contact region, while the reduced region is a second contact region which is positioned obliquely with respect to the first contact region.

If the tilting or oblique position of the inner component is intended to be tolerated in two directions or with an alternating sign, a third contact region for the outer component is formed adjacent to the first contact region, said third contact region being positioned obliquely with respect to the first contact region and with respect to the second contact region. The first contact region constitutes a middle contact region, while the second and the third contact region each constitute a lateral contact region.

The contact regions are preferably curved contact surfaces.

In conjunction with the first embodiments, the angle of inclination of a contact region is defined in this document as the angle of the oblique position of the contact region concerned, which angle can result from removing material from the outer circumferential surface of the bearing shell. In this document, the angle of inclination of the inner raceway is defined as the angle of the tilting or oblique position of the inner raceway, which angle results from the deflection of the inert component, and which may vary.

In order to achieve asymmetric optimization in the case of tiltings or oblique positions of the inner raceway or of the inner component in two directions or with an alternating sign, it is preferred if the value of the angle of inclination of the second contact region is not equal to the value of the angle of inclination of the third contact region. The second and the third contact region are therefore not only obliquely positioned in different directions, but also with a different steepness.

An edge is preferably formed between the contact region and the reduced region. Said edge defines the boundary between the two regions.

The elastic movement of the reduced region outwards takes place in particular by bending the reduced region in relation to the contact region. In addition, the edge can also yield elastically by being pressed in.

If, in the majority of cases, the tilting or oblique position reaches a predetermined value, the edge can be formed in the transition between the first and the second contact region in a simple manner in terms of apparatus. If the tilting or oblique position generally reaches two predetermined values, respective edges can be formed in the transitions between the three contact regions in a simple manner in terms of apparatus. If, by contrast, intermediate values of the tilting or oblique position are also intended to be optimally tolerated, the transition or the transitions may also be rounded.

For manufacturing reasons, it is preferred, according to a second embodiment, if a step or a shoulder is formed at the edge. The position of the edge is therefore more reproducible and more dimensionally accurate than in the case of the first embodiments. Put more precisely, the widths of the finished and ground contact region and of the reduced region are more reproducible and dimensionally accurate than in the case of the contact regions which are positioned obliquely with respect to one another.

In order to reduce the stress, it is preferred if a rounded transition is formed between the reduced region and the edge.

The step can have a flank which is arranged between the rounded transition and the edge and which is positioned at between 90 and 120 degrees with respect to the contact region and with respect to the reduced region. A flank is preferred here which is positioned at 90 degrees with respect to the contact region and with respect to the reduced region and therefore runs radially.

For manufacturing reasons, it is preferred if the reduced region is likewise in the shape of a portion of a circumferential surface of a circular cylinder. The circular cylinder of the reduced portion has a smaller diameter here than the circular cylinder of the contact portion.

If the rolling elements are cylinder rollers or needle rollers, line contacts with the two raceways arise over the entire length of the rolling elements, as a result of which force is optimally distributed over the length of the rolling elements and over the width of the bearing shell.

In a departure, the rolling elements can also be spherical or barrel-shaped, and therefore the tolerance of the tilting or oblique position is further increased.

In a preferred variant, the contact region and the reduced region have a constant width in sections or over the entire length of the circular-arc-shaped bearing shell or over the entire circumference of the circular-ring-shaped bearing shell. In the first embodiments, a constant angle of inclination of the second contact region is therefore produced. The edge between the first and the second contact region is then correspondingly parallel to the outer edges of the bearing shell in regions or over the entire length.

It is simple in terms of manufacturing if the reduced region extends over an entire length of the circular-arc-shaped bearing shell or over the entire circumference of the circular-ring-shaped bearing shell.

The outlay in terms of manufacturing is minimized if the bearing shell has a constant cross-sectional area over the entire length or over the entire circumference, i.e. if the rolling-element-side inner side of the bearing shell also has a constant shape over the entire length or over the entire circumference.

If the supporting and force ratios change along a portion of the length or along a portion of the circumference of the bearing shell, the roller bearing according to the disclosure can be adapted thereto by the widths of the contact region and of the reduced region having an increasing or decreasing width along the portion. The edge along said portion between the contact region and the reduced region is then not circular-ring-shaped. In the case of the circular-arc-shaped bearing shell, it is particularly preferred if the width of the reduced region is at maximum in the center of the bearing shell.

The circular-arc-shaped bearing shell can have two end portions, over the respective entire width of which the circular-cylindrical contact region is formed, i.e. a reduced region is not provided. The reduced region then extends only over a central region of the bearing shell, which central region is arranged between the two end portions.

The roller bearing according to the disclosure can be developed to form a bearing arrangement with two such roller bearings, wherein the two inner raceways and the two bearing shells are circular-arc-shaped, and wherein the respective reduced regions are formed on the mutually facing side edges of the two bearing shells.

A particularly preferred use of the bearing arrangement is provided in the mounting of the swash plate of an axial piston machine. The two inner raceways are formed on the swash plate, while the two bearing shells bear against a contact surface of a housing of the axial piston machine. In particular, the two contact regions of the two outer bearing shells are always in contact here with the contact surface of a housing. An axial piston machine of swashplate design is therefore provided, in which the two roller bearings of the swivel cradle can tolerate the deflection of the latter without the roller bearings being restricted to barrel-shaped or spherical rolling elements with spot-type contact.

The inequation $$\alpha_2 > \arctan\frac{\tan\alpha_{1max} \times l_1}{l_2}$$

preferably applies in the first embodiments, wherein $\alpha_2$ is the angle of inclination of the second contact region in relation to the contact surface of the housing. Therefore, $180°-\alpha_2$ is the angle between the first and the second contact region. Furthermore, $\alpha_{1max}$ is the maximum angle of inclination of the inner raceway. Furthermore, $l_1$ is a length of the rolling element. Furthermore, $l_2$ is the projection of the width of the second contact region onto the contact surface of the housing.

Figure 11:
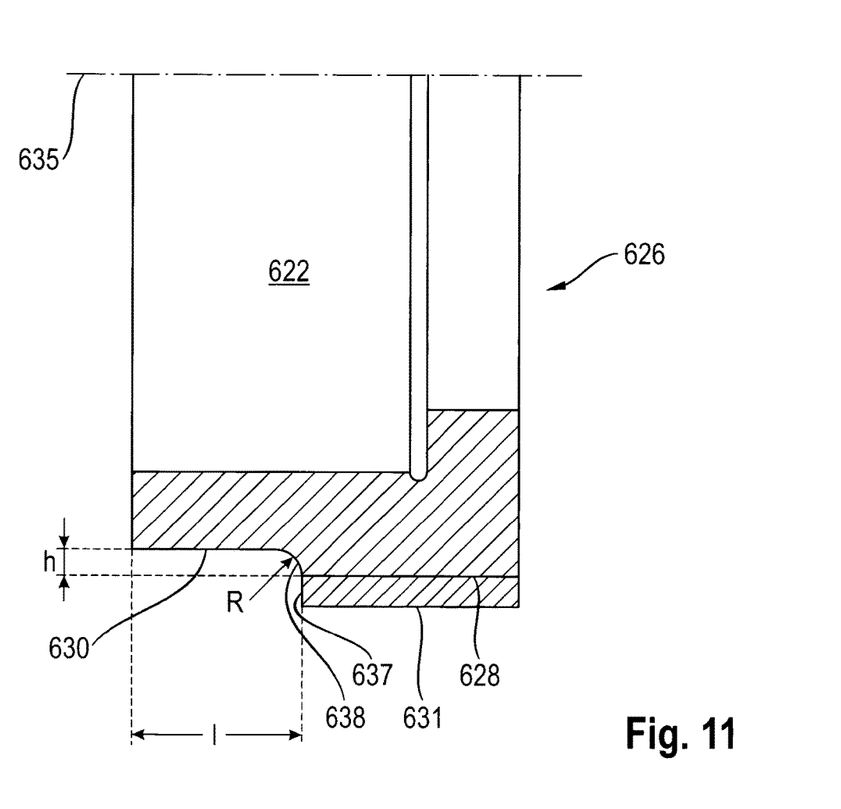
FIG. 11 shows, in a cross section, a bearing shell according to the second embodiment of the roller bearing according to the disclosure in an intermediate state of the manufacturing of said bearing shell.
Figure 12:
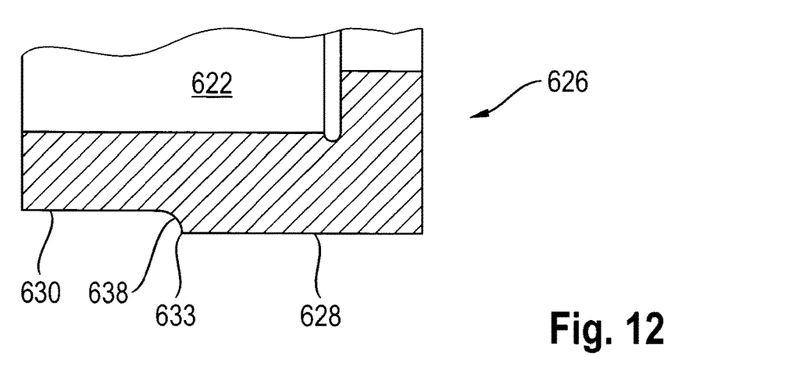
FIG. 12 shows, in a cross section, the bearing shell from FIG. 11 after its finishing.

A plurality of exemplary embodiments of the roller bearing according to the disclosure and an exemplary embodiment of the axial piston machine according to the disclosure are illustrated in the drawings. The disclosure will now be explained in more detail with reference to the figures of said drawings. FIGS. 1 to 10 show the first embodiments, while FIGS. 11 and 12 show the second embodiment.

DETAILED DESCRIPTION

Figure 1:
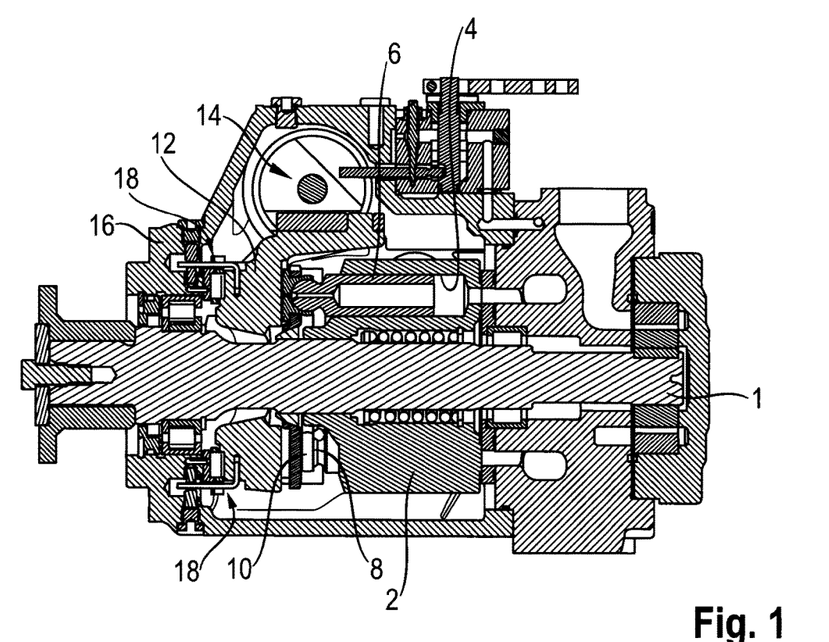
FIG. 1 shows, in a longitudinal section, an axial piston machine according to the disclosure of swash plate design according to an exemplary embodiment.

FIG. 1, shows in a longitudinal section, an axial piston machine according to the disclosure of swash plate design. It has a cylinder drum 2 which is coupled to the outer circumference of a drive shaft 1 for rotation therewith and on the circumference of which a plurality of uniformly distributed cylinder bores 4 are provided, of which only one cylinder bore 4 is illustrated in FIG. 1. Respective piston 6 are guided in an axially movable manner in the cylinder bores, said pistons being coupled via respective piston feet 8 and sliding shoes 10 to a stationary swash plate which is designed as a swivel cradle 12. The drive shaft 1 passes through the center of the swivel cradle 12.

The swivel cradle 12 can be swiveled via an adjustment device 14 about a swivel axis (not shown) which runs perpendicularly to the drive shaft 1 and parallel to the plane of the drawing of FIG. 1. If the drive shaft 1 revolves with the cylinder drum 2 and with the pistons 6, and if the swivel cradle 12 is oriented here perpendicularly to the drive shaft 1, no stroke of the piston 6 in the cylinder bores 4 is produced. If, by contrast, the swivel cradle 12 is positioned obliquely in relation to the drive shaft 1 by the adjustment device 14, each piston 6 executes an inwards stroke and an outwards stroke in its cylinder bore 4 during one revolution. During each change in the swivel angle, the swivel cradle 12 moves about the swivel axis and relative to the housing 16 of the axial piston machine. For this purpose, the swivel cradle 12 is supported and mounted on two mutually opposite sides of the drive shaft 1 in relation to the housing 16 via a respective circular-arc-shaped roller bearing 18.

Figure 2:
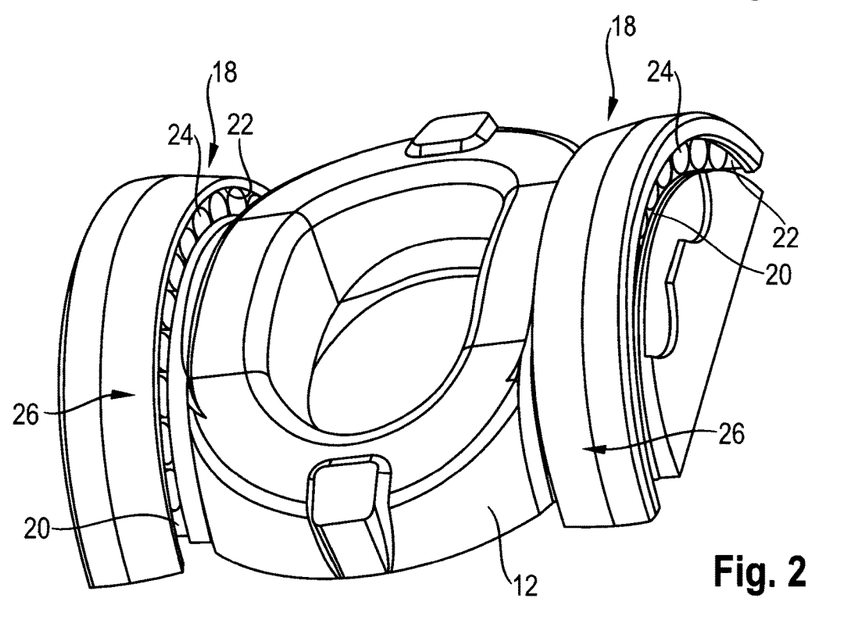
FIG. 2 shows, in a perspective view, a bearing arrangement with two roller bearings according to the disclosure according to a first exemplary embodiment.

FIG. 2 shows the swivel cradle 12 with the two roller bearings 18 without the housing 16 in a perspective illustration. Each roller bearing 18 has a circular-arc-shaped inner raceway on the swivel cradle side and a circular-arc-shaped outer raceway 22 on the housing side, between which a multiplicity of circular-cylindrical rolling elements 24 are in each case clamped. The two outer raceways 22 are formed on inner sides of respective circular-arc-shaped bearing shells 26 which are supported via their outer circumferential surfaces on the housing 16 (cf. FIG. 1).

Figure 3:
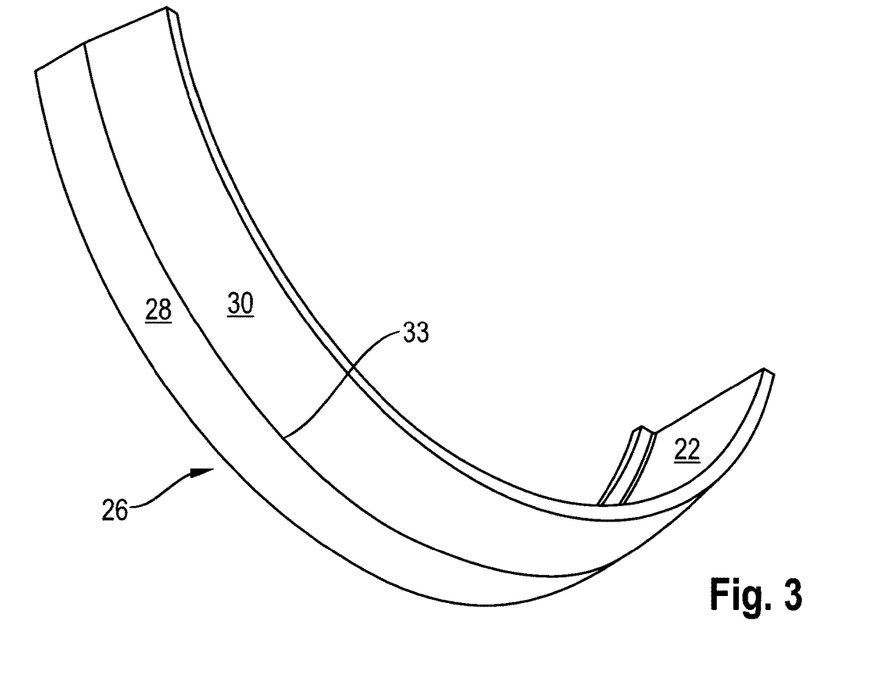
FIG. 3 shows, in a perspective view, a bearing shell of the first exemplary embodiment according to FIG. 2.

FIG. 3 shows a circular-arc-shaped bearing shell 26 of the axial piston machine according to the disclosure from FIG. 1 or of the first exemplary embodiment of the roller bearing according to the disclosure from FIG. 2 in a perspective view. Two strip-shaped contact regions 28, 30 which are parallel to each other are formed on the outer circumferential surface of the bearing shell 26, via which the bearing shell 26 is supported on the housing 16 (cf. FIG. 1), wherein a first contact region 28 has a circular-cylindrical shape with respect to the swivel axis (not shown), while a second contact portion 30 constitutes a portion of a surface of a cone. The first contact region 28 is somewhat narrower than the second contact region 30. An edge 33 between the two contact regions 28, 30 is parallel to the side edges of the bearing shell 26. An encircling radial projection which serves for guiding the rolling bodies 24 is formed on the inner side of the bearing shell 26 next to the inner raceway 20.

Figure 4:
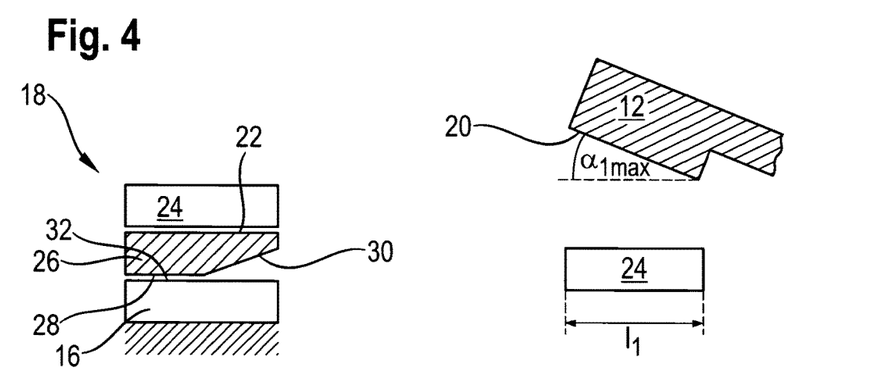
FIG. 4 shows, in a schematic cross section, a bearing according to the first exemplary embodiment.

The bearing shell 26 has a constant cross section over its entire length, as a result of which its production outlay is minimized FIG. 4 shows a cross section through one of the roller bearings 18 according to the first exemplary embodiment. During the operation of the axial piston machine according to the disclosure and in the case of a small supporting load which is transmitted from the swash plate 12 to the housing 16, the first contact region 28 bears against a correspondingly shaped contact surface 32 of the housing 16. If, by contrast, the pistons 6 are pressed against the swash plate 12 via the working pressure in the cylinder bores 4, and said swash plate is supported on the housing 16 via the two lateral roller bearings 18, a variable deflection of the swivel cradle 12 occurs, which leads to a variable angle of inclination $\alpha_1$ of the inner raceway 20 of the swivel cradle 12.

Figure 5:
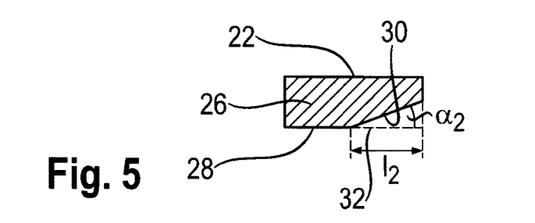
FIG. 5 shows, in a schematic cross section, separated components of the bearing from FIG. 4.

FIG. 5 shows the roller bearing 18 from FIG. 4 including a portion of the swivel cradle 12, on which the inner raceway 20 is formed. The maximum deflection of the swivel cradle 12 is shown in FIG. 5, said deflection therefore leading to a maximum angle of inclination $\alpha_{1max}$ of the inner raceway 20. In this operating state, the rolling elements 24 and the bearing shell 26 can likewise tilt and be positioned obliquely. The bearing shell 26 is supported on the contact surface 32 (only shown schematically in FIG. 5) of the housing 16 no longer via the first contact region 28, but rather via the second contact region 30 which is positioned obliquely with respect thereto. The second contact region 30 is positioned at an angle of inclination $\alpha_2$ in relation to an extension of the first contact region 28 or in relation to the contact surface 32 (in the non-tilted state of the bearing shell 26). The abovementioned relationship $$\alpha_2 > \arctan\frac{\tan\alpha_{1max} \times l_1}{l_2}$$

applies, wherein $l_1$ is the length of the rolling elements 24 while $l_2$ is the length of the projection of the width of the second contact region 30 onto the extension of the first contact region 28 or (in the non-tilted state of the bearing shell 26) onto the contact surface 32 of the housing 16.

The illustrations of FIGS. 4 and 5 and the descriptions in this regard also apply in the exemplary embodiments below according to FIGS. 6 to 8.

Figure 6:
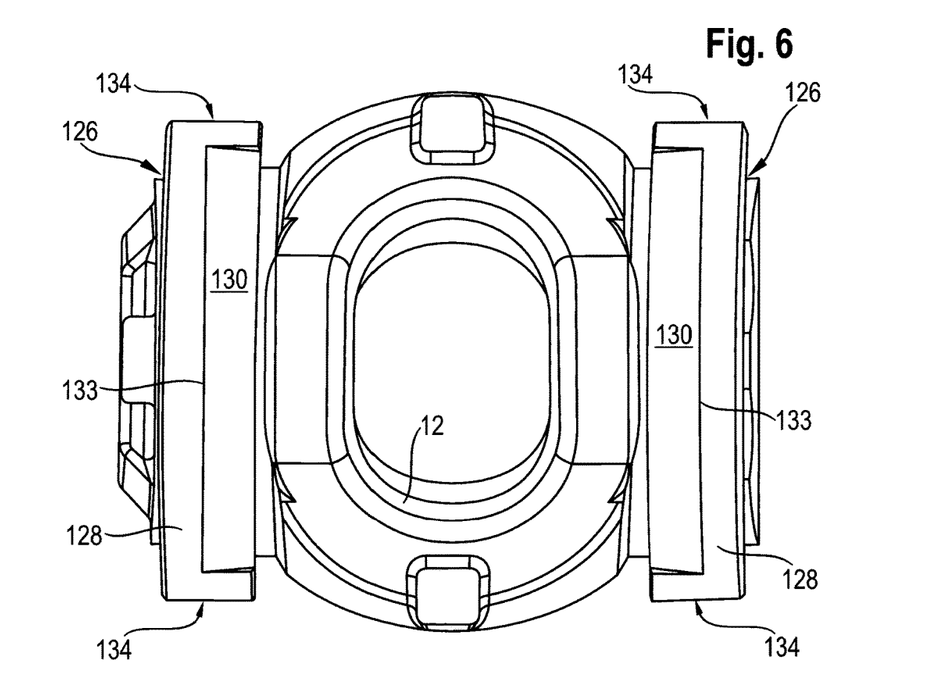
FIG. 6 shows, in a view, a bearing arrangement with two roller bearings according to the disclosure according to a second exemplary embodiment.

FIG. 6 shows a second exemplary embodiment of a bearing arrangement according to the disclosure with two roller bearings for supporting the swivel cradle 12, wherein the contrast with the first exemplary embodiment according to FIG. 2 can be seen in the fact that no second contact region 130 is provided on the two end portions 134 of each circular-arc-shaped bearing shell 126, but rather that the first contact region 128 extends in each case over the full width of the end portions 134. The second obliquely positioned contact region 130 therefore extends only over a central region of the bearing shell 126.

In the case of the first exemplary embodiment according to FIGS. 2 and 3 and in the case of the second exemplary embodiment according to FIG. 6, a symmetrical and uniform stress correction which is independent of the swivel angle of the swivel cradle 12 is provided in each case by the shaping of the bearing shell 26; 126.

Figure 7:
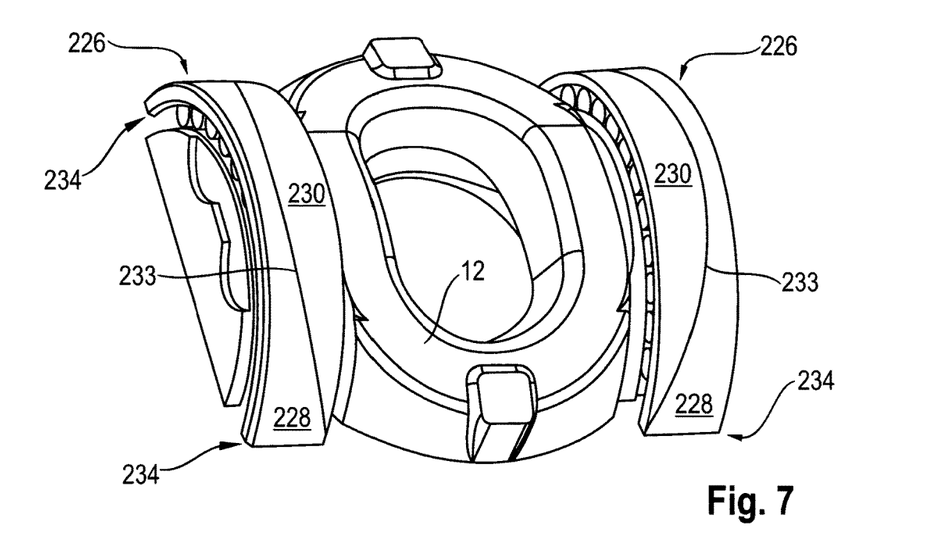
FIG. 7 shows, in a perspective view, a bearing arrangement with two roller bearings according to the disclosure according to a third exemplary embodiment.

FIG. 7 shows a third exemplary embodiment of a bearing arrangement according to the disclosure with two roller bearings for supporting the swivel cradle 12, wherein, on the end portions 234 of the circular-arc-shaped bearing shells 226, the first contact region 228 is provided over the entire width of the respective bearing shell 226. The second obliquely positioned contact region 230 therefore extends over the bearing shell 226 only in the central region in each case. In a departure from the first exemplary embodiments, the width of the first contact region 228 and of the second contact region 230 varies. Put more precisely, in the vicinity of the end portions 234, the first contact region 228 is in each case comparatively wide, while the second contact region 230 is comparatively narrow, whereas, in the center of the respective bearing shell 226, conversely the first contact region 228 is comparatively narrow, while the second contact region 230 is comparatively wide. In the center of the bearing shell 226, the width of the first contact region 228 is at a minimum and the width of the second contact region 230 is at a maximum. The edge 233 between the two contact regions 228, 230 can therefore appear curved (in an appropriate view). Therefore, in the case of the third exemplary embodiment according to FIG. 7, a stress correction which depends on the swivel angle of the swivel cradle 12 is provided. The symmetrical configuration of the bearing shell 226 provides a symmetrical stress correction profile, i.e. a profile which is uniform for both signs of the swivel angle.

Figure 8:
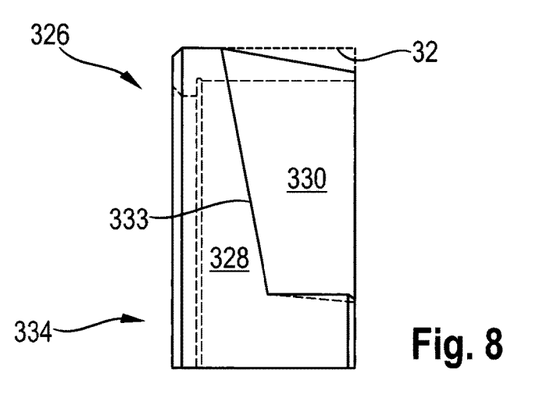
FIG. 8 shows, in a view, a bearing shell of a fourth exemplary embodiment of the roller bearing according to the disclosure.

FIG. 8 shows a circular-arc-shaped bearing shell 326 according to a fourth exemplary embodiment of the roller bearing according to the disclosure in a lateral view. The profiles of the first contact region 328, of the edge 333 and of the second contact region 330 in the central region of the bearing shell 326 are comparable to those of the third exemplary embodiment from FIG. 7. In a departure from the third exemplary embodiment, the end portions, of which only one end portion 334 can be seen in FIG. 8, and over which the first contact region 328 extends, are enlarged. The edge 333 between the two contact regions 328, 330 has a bend in the region of each end portion 334.

Figure 9:
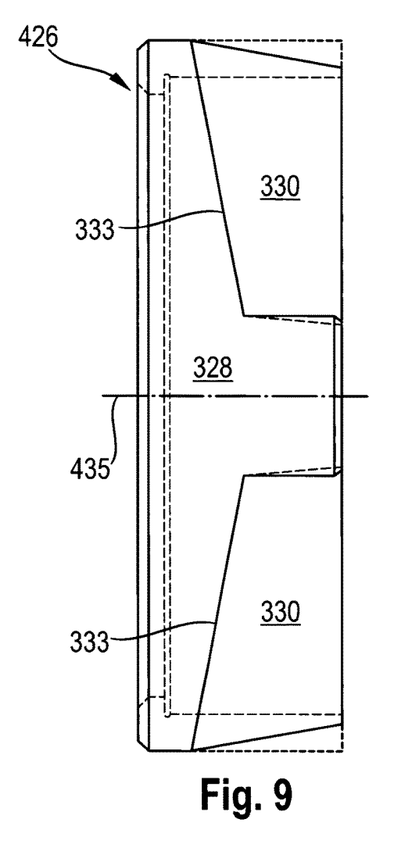
FIG. 9 shows, in a view, a circular-ring-shaped bearing shell of a fifth exemplary embodiment of the roller bearing according to the disclosure.

FIG. 9 shows a circular-ring-shaped bearing shell 426 according to a fifth exemplary embodiment of the roller bearing according to the disclosure. The bearing shell 426 is formed by a geometrical duplication of the bearing shell 326 of the fourth exemplary embodiment according to FIG. 8. In a departure from the preceding exemplary embodiments, the roller bearing according to the disclosure that is therefore formed is not provided for the mounting of a swivel cradle 12. On the contrary, an inner component (not shown specifically) rotating about an axis of rotation 435 is mounted therewith. The bearing shell 426 can be adapted by the two obliquely positioned second contact regions 230, which are arranged on different sides of the axis of rotation 435, to two mutually opposed deflection directions of the inner component. Precisely one direction of the bearing force to be supported is assigned here to each deflection direction.

Figure 10:
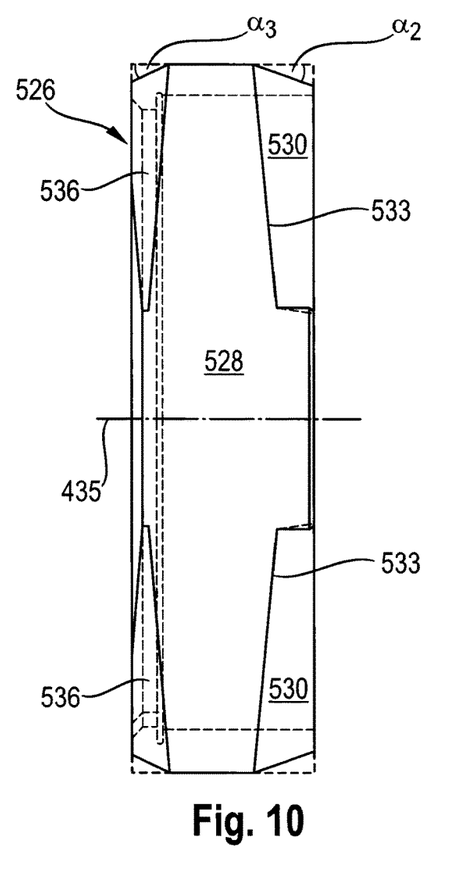
FIG. 10 shows, in a view, a circular-ring-shaped bearing shell of a sixth exemplary embodiment of the roller bearing according to the disclosure.

FIG. 10 shows a circular-ring-shaped bearing shell 526 of a sixth exemplary embodiment of a roller bearing, wherein two different directions of the deflection of the inner rotating component can be tolerated. The functional extension in relation to the fifth exemplary embodiment from FIG. 9 can be seen in the fact that two different directions of the bearing force to be supported are possible for each deflection direction. The contact regions 530, 536 which each lie diagonally opposite each other in FIG. 10 serve for this purpose. Put more precisely, on different sides of the axis of rotation 435, the bearing shell 526 in each case has a second contact region 530 which is beveled by an angle of inclination $\alpha_2$ in relation to the first contact region 528, and the width of which is at maximum approximately one third of the overall width of the bearing shell 526. Furthermore, on mutually opposite sides of the axis of rotation 435, the bearing shell 526 in each case has a third contact region 536 which is beveled about an angle of inclination $\alpha_3$ in relation to the first contact region 528, and the maximum width of which is less than one third of the entire width of the bearing shell 526. The angle of inclination $\alpha_3$ of the two third contact regions 536 is larger here than the angle of inclination $\alpha_2$ of the two second contact regions 530. As viewed in the circumferential direction, the two contact regions 530, 536, which lie on a common side of the axis of rotation 435, extend approximately over a same circumferential portion of the bearing shell 526.

FIG. 11 shows, in a cross section, a detail of a bearing shell 626 according to the second embodiment of the roller bearing according to the disclosure in an intermediate state of the manufacturing of said bearing shell. An outer circumferential surface 631 has, by means of turning, obtained a diameter which is initially still larger than that which the contact region 628 of the final bearing shell 626 will have.

The reduced region 630 is produced in a width 1 by turning and—in a departure from the first embodiment according to the preceding figures—has a circular-cylindrical shape.

A step which has a radial flank 637, at least in the intermediate state according to FIG. 11, is formed between the reduced region 630 and the outer circumferential surface 631. A transition 638 between the reduced region 630 and the flank 637 is rounded with a radius R. The latter can be, for example, 0.4 mm In a manufacturing step following the turning, the bearing shell 626 is heat-treated and therefore hardened.

FIG. 12 shows, in a cross section, a detail of the finished bearing shell 626 from FIG. 11 after the heat treatment and after the grinding of the outer circumferential surface 631 to the size of the contact portion 628. The radial flank 637 has also been substantially removed. This forms an edge 633 which is arranged between the rounded transition 638 and the contact portion 628. In the ideal case, the rounded transition 638 is a quarter circle, and therefore the edge 633 is right-angled. This edge 633 has improved dimensional accuracy in comparison to the first embodiments according to FIGS. 1 to 10, and the position of the edge 633 is insensitive to manufacturing tolerances.

The reduced region 630 does not need to be ground since it does not come into contact with the outer component or with the housing of the axial piston machine.

In a departure from the exemplary embodiment, which is shown in FIGS. 11 and 12, of the second embodiment, a minimum residue of the flank 637 may remain even after the grinding of the outer circumferential surface 631. The advantageous right-angled shape of the edge and therefore the insensitivity thereof to manufacturing tolerances are maintained.

FIGS. 11 and 12 do not show the bearing shell 626 to scale. For example, a diameter difference h between the contact region 628 and the reduced region 630 and a thickness of the ground outer circumferential surface 631 in relation to the bearing shell 626 are significantly smaller than illustrated in the figures.

A rolling bearing, the rollers of which are clamped between an inner raceway and an outer bearing shell, is disclosed. The outer bearing shell bears with its outer circumferential surface against an outer component which can be a housing of an axial piston machine. The inner raceway is either formed directly on an inner component, or it is formed on an inner bearing shell which bears against the inner component. In order to permit tilting of the inner component, wherein the rollers remain in predetermined contact with the two raceways, at least one beveled contact region or a region reduced in another way is provided on the outer circumferential surface of the outer bearing shell.

LIST OF REFERENCE SIGNS

1 Drive shaft
2 Cylinder drum
4 Cylinder bore
6 Piston
8 Piston foot
10 Sliding shoe
12 Swivel cradle
14 Adjustment device
16 Housing
18 Roller bearing
20 Inner raceway
22 Outer raceway
24 Rolling element
26;126;226;326;626 Circular-arc-shaped bearing shell
28;128;228;328;528;628 First contact region
30;130;230;330;530 Second contact region
32 Contact surface
33;133;233;333;533;633 Edge
134;234;334 End portion
426;526 Circular-ring-shaped bearing shell
435;635 Axis of rotation
536 Third contact region
630 Reduced region
631 Outer circumferential surface
637 Flank
638 Rounded transition
$l_1$ Length of the rolling elements
$l_2$ Projection of the width of the second contact region onto the contact surface of the housing
$\alpha_1$ Angle of inclination of the inner raceway
$\alpha_{1max}$ Maximum angle of inclination of the inner raceway
$\alpha_2$ Angle of inclination of the second contact region
$\alpha_3$ Angle of inclination of the third contact region
h Diameter difference
l Width
R Radius

What is claimed is:

1. A roller bearing, comprising:
two concentric circular-arc-shaped or circular-ring-shaped raceways, including an outer raceway formed on a circular-arc-shaped or circular-ring-shaped outer bearing shell; and
a plurality of rolling elements accommodated between the two raceways,
wherein an outer circumference of the outer bearing shell defines a first contact region shaped as a portion of a circumferential surface of a circular cylinder,
wherein the outer circumference defines a second contact region formed as a reduced region adjacent to the first contact region, the reduced region positioned obliquely with respect to the first contact region in such a way that a first edge is defined between the first and second contact regions,
wherein the outer circumference defines a third contact region adjacent to the first contact region and on an opposite side of the first contact region relative to the second contact region, the third contact region positioned obliquely relative to the first and second contact regions in such a way that a second edge is defined between the first and third contact regions, and
wherein the first contact region and the reduced region have a changing width along a portion of a length or circumference of the outer bearing shell.

2. The roller bearing according to claim 1, wherein a value of an angle of inclination of the second contact region is not equal to a value of an angle of inclination of the third contact region.

3. The roller bearing according to claim 1, wherein the rolling elements are circular-cylindrical.

4. The roller bearing according to claim 1, wherein the rolling elements are spherical or barrel-shaped.

5. A bearing arrangement, comprising:
two roller bearings, each roller bearing including:
- two concentric circular circular-arc-shaped or circular-ring-shaped raceways, including an outer raceway formed on an outer bearing shell and an inner raceway; and
- a plurality of rolling elements accommodated between the two raceways, wherein:

an outer circumference of the outer bearing shell defines a first contact region shaped as a portion of a circumferential surface of a circular cylinder, the outer circumference defines a second contact region formed as a reduced region adjacent to the first contact region, the reduced region positioned obliquely with respect to the first contact region in such a way that a first edge is defined between the first and second contact regions, the outer circumference defines a third contact region adjacent to the first contact region and on an opposite side of the first contact region relative to the second contact region, the third contact region positioned obliquely relative to the first and second contact regions in such a way that a second edge is defined between the first and third contact regions, the first contact region and the reduced region have a changing width along a portion of a length or circumference of the outer bearing shell, the inner raceway and the outer bearing shell are circular-arc-shaped, and the respective reduced regions are formed on mutually facing side edges of the two outing bearing shells.

6. An axial piston machine of swashplate design, comprising:
a housing;
a swashplate; and
a bearing arrangement, comprising:
two roller bearings, each roller bearing including:
- two concentric circular circular-arc-shaped or circular-ring-shaped raceways, including an outer raceway formed on an outer bearing shell and an inner raceway; and
- a plurality of rolling elements accommodated between the two raceways, wherein:

an outer circumference of the outer bearing shell defines a first contact region shaped as a portion of a circumferential surface of a circular cylinder, the outer circumference defines a second contact region formed as a reduced region adjacent to the first contact region, the reduced region positioned obliquely with respect to the first contact region in such a way that a first edge is defined between the first and second contact regions, the outer circumference defines a third contact region adjacent to the first contact region and on an opposite side of the first contact region relative to the second contact region, the third contact region positioned obliquely relative to the first and second contact regions in such a way that a second edge is defined between the first and third contact regions, the first contact region and the reduced region have a changing width along a portion of a length or circumference of the outer bearing shell, the inner raceway and the outer bearing shell are circular-arc-shaped, the respective reduced regions are formed on mutually facing side edges of the two outing bearing shells, the two inner raceways are formed on the swashplate, and the two outer bearing shells bear against the housing.

7. The axial piston machine according to claim 6, wherein:
a maximum angle of inclination ($\alpha_{1max}$) of the inner raceway, an angle of inclination ($\alpha_2$) of the reduced region in relation to a contact surface of the housing, a length ($1_1$) of the rolling elements, and a projection ($1_2$) of a width of the reduced region onto the contact surface of the housing satisfy the following inequation:

$$\alpha_2 > \arctan\frac{\tan\alpha_{1max} \times l_1}{l_2}.$$

* * * * *

UNITED STATES PATENT AND TRADEMARK OFFICE
CERTIFICATE OF CORRECTION

PATENT NO. : 10,060,478 B2  
APPLICATION NO. : 15/166839  
DATED : August 28, 2018  
INVENTOR(S) : Achim Romer et al.

Page 1 of 1

It is certified that error appears in the above-identified patent and that said Letters Patent is hereby corrected as shown below:

In the Claims

In Column 11, Lines 30-31, Lines 30-31 of Claim 5 should read:
the respective reduced regions are formed on mutually
  facing side edges of the two outer bearing shells.

In Column 12, Lines 24-25, Lines 34-35 of Claim 6 should read:
the respective reduced regions are formed on mutually
  facing side edges of the two outer bearing shells, Signed and Sealed this  
Twelfth Day of February, 2019

Andrei Iancu  
*Director of the United States Patent and Trademark Office*